United States Patent [19]

Ikeuchi

[11] Patent Number: 5,119,262
[45] Date of Patent: Jun. 2, 1992

[54] HIGH-VOLTAGE TRANSFORMER PROTECTION CIRCUIT
[75] Inventor: Hiroshi Ikeuchi, Kanagawa, Japan
[73] Assignee: Murata Mfg. Co., Ltd., Kyoto, Japan
[21] Appl. No.: 386,361
[22] Filed: Jul. 26, 1989
[30] Foreign Application Priority Data Aug. 22, 1988 [JP] Japan ................... 63-208932
Jun. 9, 1989 [JP] Japan ................... 1-147699

[51] Int. Cl.⁵ .................. H02H 3/087; H02H 7/04
[52] U.S. Cl. ........................ 361/18; 315/411; 361/57; 363/56
[58] Field of Search ............... 361/35, 36, 86, 37, 361/41, 87, 92, 104, 39, 18, 54-57; 363/55-57; 358/190; 315/411

[56] References Cited
U.S. PATENT DOCUMENTS 4,149,209  4/1979  Stark, Jr. .................. 201/104 X
4,754,206  6/1988  Sorensen .................. 315/411
4,885,509  12/1989  Ikeuchi .................... 315/411

Primary Examiner—A. D. Pellinen
Assistant Examiner—David Osborn
Attorney, Agent, or Firm—Koda and Androlia

[57] ABSTRACT

A protection circuit against an excessive current in a flyback transformer which supplies a high voltage to a CRT. A fuse and current detecting resistor are inserted on the line which supplies a current to the primary winding of the flyback transformer. The intermediate point of the primary winding and the node of the fuse and current detecting resistor are connected by a semiconductor switching element which becomes conductive when the voltage across the current detecting resistor reaches a certain high voltage. Accordingly, if an excessive current flows in the flyback transformer, the thyristor turns on, causing the fuse to be blown by the large current, whereby the current supply to the flyback transformer can be shut off.

10 Claims, 4 Drawing Sheets

HIGH-VOLTAGE TRANSFORMER PROTECTION CIRCUIT

BACKGROUND OF THE INVENTION

1. Field of the Invention

The present invention relates to a high-voltage transformer protection circuit, and particularly to the improvement of a current shut-off function which is provided against the occurrence of abnormalities of a high-voltage transformer.

2. Description of the Prior Art

For the generation of a high voltage, there have been widely used high-voltage transformers such as a flyback transformer. For example, in order to supply a high voltage to the high-voltage electrode of a CRT (cathode ray tube) of a television receiver or the like, the above-mentioned high-voltage transformer is necessary. Because of increasing demands of CRT's as a display device along with the progress of computer equipment, the importance of high-voltage transformers is also rising steadily.

An example of circuits using such high-voltage transformers will be explained on FIG. 3.

This circuit is a general circuit for the deflector used in a CRT, and it comprises a horizontal deflection output circuit 30 and a high-voltage transformer 10. The high-voltage transformer 10 supplies its output to a CRT 32.

The horizontal deflection output circuit 30 includes a horizontal output transistor $T_{R1}$, a damper diode $D_1$, a resonance capacitor $C_1$, a horizontal deflection coil $L_H$, and an S-shape correction capacitor $C_S$. The horizontal output transistor $T_{R1}$ receives a voltage pulse signal sent from the horizontal oscillation circuit (not shown) and implements the prescribed switching operation. The horizontal output transistor $T_{R1}$ and damper diode $D_1$ operate in unison to supply a saw-tooth current to the horizontal deflection coil $L_H$. In response to the current, the horizontal deflection coil $L_H$ and resonance capacitor $C_1$ operate resonantly to generate a flyback pulse, which is applied to the high-voltage transformer 10.

The high-voltage transformer 10 has its primary winding $N_1$ connected at one end to the common terminal of the cathode of the damper diode $D_1$, the horizontal deflection coil $L_H$ and the resonance capacitor $C_1$, and connected at another end $T_1$ to the input power source $E_B$. The high-voltage transformer 10 has its secondary winding $N_H$ connected at the end of high-voltage side to the high-voltage electrode (anode) of the CRT (cathode ray tube) 32 through a high-voltage rectifying diode $D_H$.

Connected in the secondary circuit, which extends from the output terminal of the secondary winding $N_H$ to the anode 34 of the CRT 32, are a focus pack $F_P$ and a smoothing capacitor $C_H$. The focus pack $F_P$ is made up of a serial connection of resistors $R_7$, $R_8$, $R_{V1}$ and $R_{V2}$, and it serves to supply a specified voltage to the screen electrode and focus electrode of the CRT 32.

In the foregoing circuit arrangement, the high-voltage transformer 10 steps up the voltage of the flyback pulse provided by the horizontal deflection output circuit 30, the high-voltage rectifying diode $D_H$ rectifies the pulse voltage, and the resulting high voltage $E_H$ is applied to the anode 34. The smoothing capacitor $C_H$ is used to smooth the high voltage $E_H$.

If the high-voltage transformer 10 has its secondary winding $N_H$ short-circuited by some reason, and increased current can possibly cause heat generation or smoke eruption.

On this account, there have been devised heat/smoke preventive means also in the conventional equipment. The conventional protection circuit will be explained on FIG. 4.

This example is intended to detect an excessive current in the power source $E_B$ in FIG. 3 thereby to limit the current supply. The circuit bases its operation on the increase in the primary current $I_B$ at the occurrence of a short-circuit on the secondary winding $N_H$.

In this example, the power source $E_B$ is arranged as follows. An input end P is a power input plug, which is plugged to the ordinary power outlet of a.c. 100 volts. The input end P is led to a rectifying circuit 42 made up of diodes $D_{21}$, $D_{22}$, $D_{23}$ and $D_{24}$ in the bridge configuration. The rectifying circuit 42 is connected on its output side with a voltage stabilizing circuit 44 so that a specified d.c. power is supplied to the high-voltage transformer 10. Namely, the output end 46 is connected to one end $T_1$ of the primary winding $N_1$ in FIG. 2. The capacitor $C_{21}$ is used to smooth the voltage.

The voltage stabilizing circuit 44 consists of a transistor $T_{R21}$, a resistor $R_{20}$ and a control circuit 48. The control circuit 48 receives the output voltage of the voltage stabilizing circuit 44, and it controls the base voltage of the transistor $T_{R21}$ so that the voltage maintain the specified level. Accordingly, the voltage stabilizing circuit 44 has its output voltage controlled to a virtually constant level, and consequently the voltage $E_B$ at the output end 46 is also virtually constant. A capacitor $C_{32}$ is used to smooth the voltage, particularly to improve the transitional response.

This example further includes an abnormal current detecting circuit 50 provided between the voltage stabilizing circuit 44 and output end 46 thereby to monitor the current $I_B$ flowing in it. The abnormal current detecting circuit 50 detects the voltage across a resistor $R_{22}$ which is inserted between the voltage stabilizing circuit 44 and output end 46, and it turns on a transistor $T_{R22}$ when the resistor voltage exceeds a predetermined level thereby to detect an abnormal current.

The resistor $R_{22}$ is connected at its one end on the upstream side with the emitter of the transistor $T_{R22}$, and at its another end on the downstream side with the base of the transistor $T_{R22}$ through a resistor $R_{23}$. A capacitor $C_{22}$ is used to absorb a short-term variation of the current $I_B$.

In the conventional high-voltage transformer protection circuit arranged as described above, when the current $I_B$ increases, causing a voltage difference across the resistor $R_{22}$ to exceed the specified value, the base-emitter voltage of the transistor $T_{R22}$ exceeds the specified value, and the transistor $T_{R22}$ becomes conductive. The transistor $T_{R22}$ has its collector grounded through resistors $R_{24}$ and $R_{25}$. Accordingly, when a current flows in the conductive transistor $T_{R22}$, the voltage at the node of the resistor $R_{24}$ and $R_{25}$ will rise by the amount of the voltage drop across the resistor $R_{25}$. A capacitor $C_{24}$ is used to remove the a.c. component at the node of $R_{24}$ and $R_{25}$.

The node of the $R_{24}$ and $R_{25}$ is connected to the base of a transistor $T_{R23}$, which has its collector connected to one input end of a photocoupler 52 and has its emitter grounded. The photocoupler 52 has another input end connected through a resistor $R_{26}$ to a power source $E_{C21}$. Accordingly, when the transistor $T_{R23}$ turns on, a light emitting diode 52a connected at the input end of the photocoupler 52 is activated. A transistor 52b on the light-sensitive side of the photocoupler 52 has its base grounded through a resistor $R_{27}$, its collector connected to a power source $E_{C22}$, and its emitter connected to a horizontal oscillation circuit 54.

When the light emitting diode 52A of the photocoupler 52 emits the light, causing the transistor 52b to turn on, an oscillation halt signal is entered to the horizontal oscillation circuit 54. Accordingly, the horizontal oscillation circuit 54 ceases oscillating in response to the reception of the oscillation halt signal. The oscillation pulse from the horizontal oscillation circuit is entered to the input terminal of the drive circuit 30 in FIG. 2, and therefore the subsidence of the pulse causes the drive circuit 30 to halt its operation. Consequently, the high-voltage transformer 10 does not generate a flyback pulse, whereby the high-voltage transformer 10 can be prevented from heat generation or smoke eruption.

The role of the photocoupler 52 is to provide the insulation (a.c. isolation) between the charging section (a.c. side) and the non-charging section which drives the horizontal oscillation circuit 54.

The conventional high-voltage transformer protection circuit has a large number of component parts and impose a high manufacturing cost, and yet suffers a low reliability. The need of a.c. isolation further increases the number of component parts.

Moreover, according to the conventional high-voltage transformer protection circuit, when the photocoupler 52 operates once to deactivate the horizontal oscillation circuit 54, if the main power supply is turned off the then turned on again, the current $I_B$ is not prevented from flowing during a period until the photocoupler 52 operates again.

By providing the high-voltage transformer 10 with a thermal fuse which a blown at a specified high temperature, the current to the high-voltage transformer 10 can be shut off. However, the high-voltage transformer has a drive frequency as high as 15.75 kHz to 130 kHz, and therefore the disposition of such a bulky component as a thermal fuse lowers the electromagnetic coupling, resulting in a deteriorated fundamental performance of the high-voltage transformer.

SUMMARY OF THE INVENTION

The present invention is intended to overcome the foregoing problems, and its prime object is to provide a simple and reliable high-voltage transformer protection circuit which performs effective current shut-off in the event of abnormalities in the high-voltage transformer.

In order to achieve the foregoing objective, the invention provides a high-voltage transformer protection circuit comprises a fuse and current detecting resistor inserted between the d.c. power source and the one end of the primary winding of the high-voltage transformer, and a semiconductor switching element disposed on a path which connects an intermediate point of the primary winding with the end of the fuse on the side of the d.c. power source and adapted to become conductive when the voltage drop across the current detecting resistor exceeds a specified value so that the semiconductor switching element becomes conductive in response to the increase in the primary current thereby to blow the fuse, thereby preventing a high-voltage winding from being supplied with an excessive current.

When the primary current increases due to an abnormality of the high-voltage transformer, the voltage drop across the current detecting resistor increases. If the voltage drop exceeds a specified value, the semiconductor switching element is made conductive.

In any case where the semiconductor switching element has its signal input terminal connected to the node of the d.c. power source and the current detecting resistor, or the semiconductor switching element has its signal input terminal connected to the intermediate section of a voltage division resistor that is connected on the node of the d.c. power source and the current detecting resistor, the relative voltage of the signal input terminal of the semiconductor switching element rises in response to the increase in the current flowing in the current detecting resistor, causing the semiconductor switching element to become conductive.

The semiconductor switching element is disposed to form a closed circuit by connecting the intermediate point of the primary winding with the fuse on its power source side, and accordingly when the semiconductor switching element becomes conductive, it short-circuits the pulse generated on the intermediate point of the primary winding, causing a large current to flow there. This large current blows the fuse, and then the current supply to the high-voltage transformer is shut off.

DESCRIPTION OF THE PREFERRED EMBODIMENTS

Figure 1:
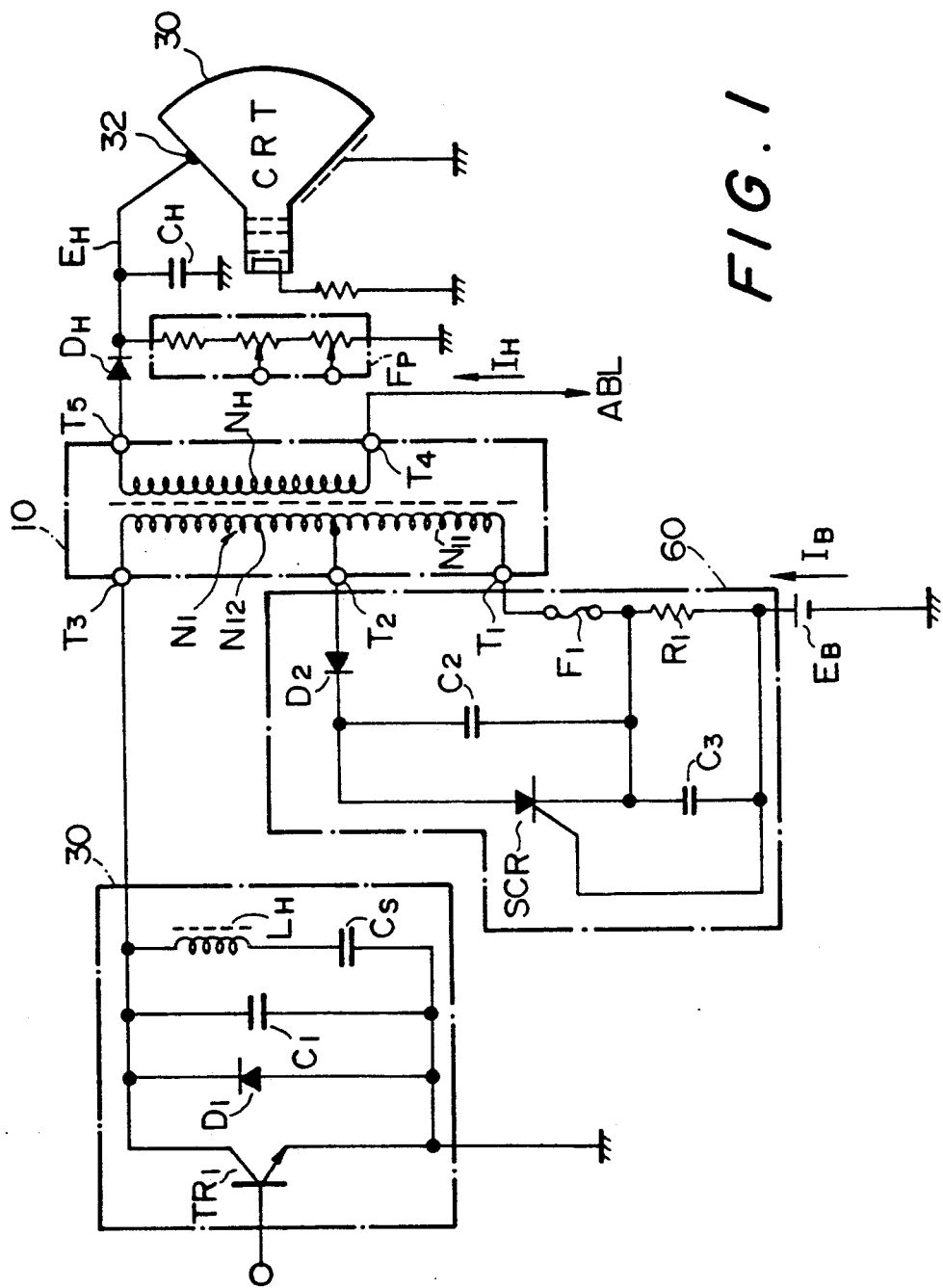
FIG. 1 is a schematic diagram showing an embodiment of the high-voltage transformer protection circuit according to the present invention.

The preferred embodiments of the present invention will be described with reference to the drawings. FIG. 1 is a schematic diagram of the first embodiment.

In the figure, the horizontal drive circuit, horizontal deflection output circuit 30 and high-voltage transformer 10 are identical in their arrangement and operation to the conventional counterparts.

This embodiment further includes a protection circuit 60.

The protection circuit 60 is intended to shut off the current supply to the high-voltage transformer 10 at the occurrence of an abnormality, and it is arranged as follows.

In the current supply circuit extending from a power source $E_B$ to the starting end $T_1$ of a primary winding $N_1$, there are inserted a resistor $R_1$ for primary current detection and a fuse $F_1$.

The primary winding $N_1$ is provided on the intermediate point with a center tap $T_2$ so that the winding can be divided into a winding $N_{11}$ on the starting end side and a winding $N_{12}$ on the ending end side. Connected to the center tap $T_2$ is the anode of a diode $D_2$ which blocks a reverse current flow. The cathode of the diode $D_2$ is connected to the anode of a thyristor SCR, which has the cathode connected to the node of a fuse $F_1$ and resistor $R_1$. Accordingly, when the thyristor SCR turns on, a closed circuit including the starting end side winding $N_{11}$ and the fuse $F_1$ will be formed. A capacitor $C_2$ which shunts the thyristor SCR is used for smoothing, and it may be omitted expediently. A capacitor $C_3$ connecting between the gate and cathode of the thyristor SCR is used for voltage smoothing and noise elimination.

At the occurrence of such an event as a layer short in the high-voltage transformer, enormous energy is consumed in the short-circuited section. Namely, a short-circuit between adjacent coils of the secondary winding of the high-voltage transformer has an energy consumption (q) as much as several watts. This energy generates the heat, by which the insulation material is melted, and the short-circuit will further expand. For example, a short-circuit across n turns of winding will result in an energy consumption of $P = nxq$.

This short-circuit attributed energy P must be supplied from the power source $E_B$. Therefore the primary current $I_B$ increases to meet the energy P. Namely, a current $\Delta I_B$ for the energy consumption P is added to the primary current.

$$\Delta I_B = p/e_B = nxq/E_B$$

For the normal primary current $I_{BO}$, the primary current $I_{BS}$ at the occurrence of abnormality becomes $I_{BS} = I_{BO} + \Delta I_B$.

By setting the breakdown voltage $E_g$ of the thyristor SCR to be $E_g < I_{BS} x R_1$, the thyristor SCR will become conductive at the occurrence of abnormality.

Once the thyristor SCR has turned on, it conducts with a very low impedance a pulse voltage generated on the center tap $T_2$ of the primary winding $N_1$, and the fuse $F_1$ is blown by the current.

By blowing the fuse $F_1$, the current supply to the primary winding $N_1$ of the high-voltage transformer can be shut off.

In the event of a destructive short-circuit occurring in the focus pack $F_P$ or smoothing capacitor $C_H$ connected on the secondary high-voltage output side of the high-voltage transformer 10, the primary current $I_B$ increases accordingly. This is because the secondary current $I_H$ is produced by the primary current $I_B$, and they have a certain correspondence.

On this account, if the secondary current $I_H$ increases due to a short-circuit in the focus pack $F_B$ or smoothing capacitor $C_H$, causing the primary current $I_B$ to reach the abnormality current $I_{BS}$, the thyristor SCR turns on, blowing the fuse $F_1$ as in the above-mentioned case, and the current supply to the high-voltage transformer 10 is shut off.

As described, this embodiment can surely shut off the current supply at the occurrence of abnormality by the addition of a simple circuit. It does not require the a.c. isolation.

The embodiment does not involve the deterioration of function of the high-voltage transformer that is the case with an embedded thermal fuse. Addition of such a protection circuit to a high-voltage transformer does not impose an increased number of input and output terminal for the high-voltage transformer block, and it readily allows a block structure.

Because the fuse $F_1$ is blown, no current flows in the high-voltage transformer when the main power supply is turned on again. The thyristor SCR which operates at the detection of abnormality may be replaced with semiconductor elements of other types.

Figure 2:
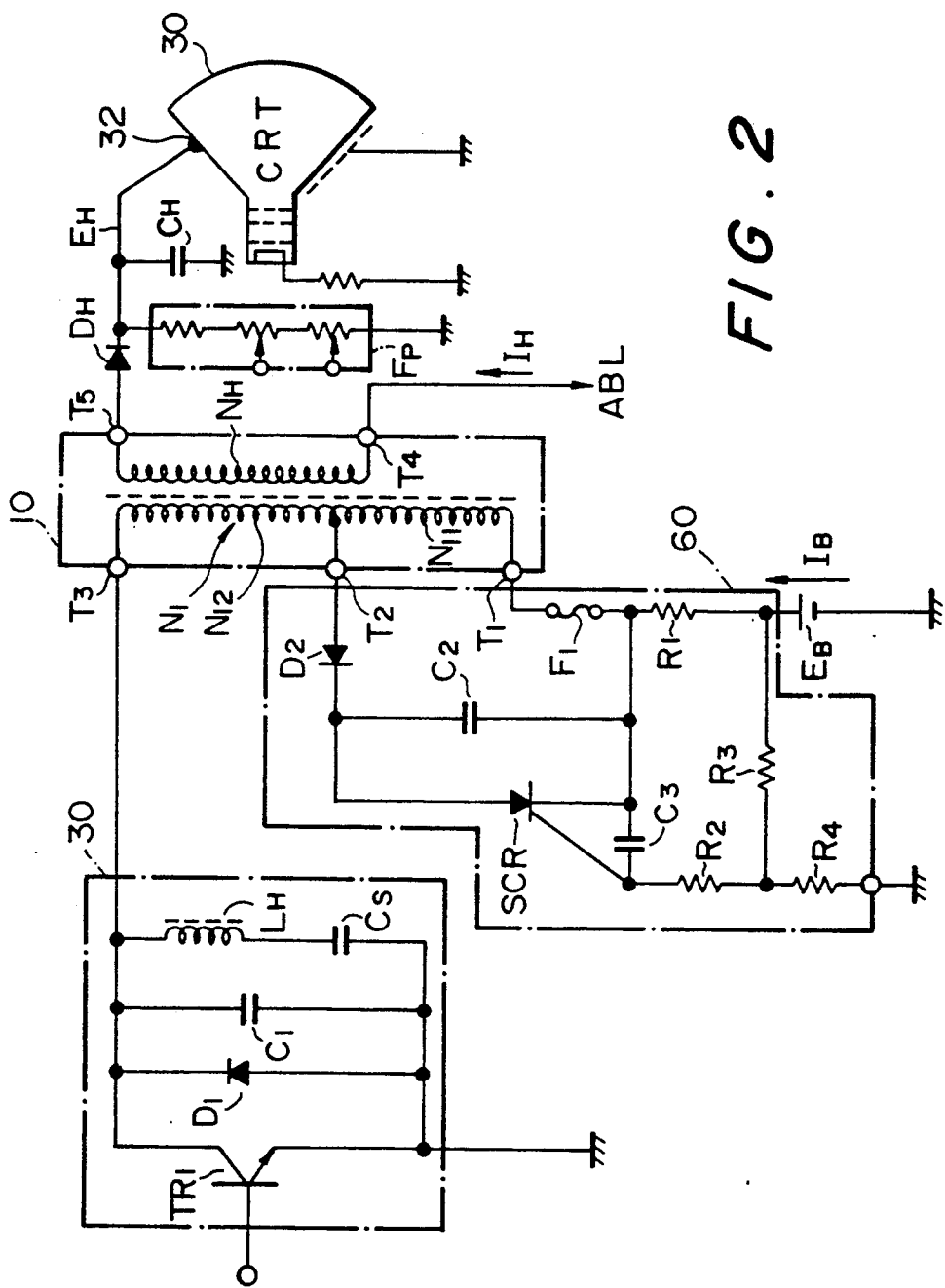
FIG. 2 is a schematic diagram showing another embodiment of the high-voltage transformer protection circuit according to the present invention.
Figure 3:
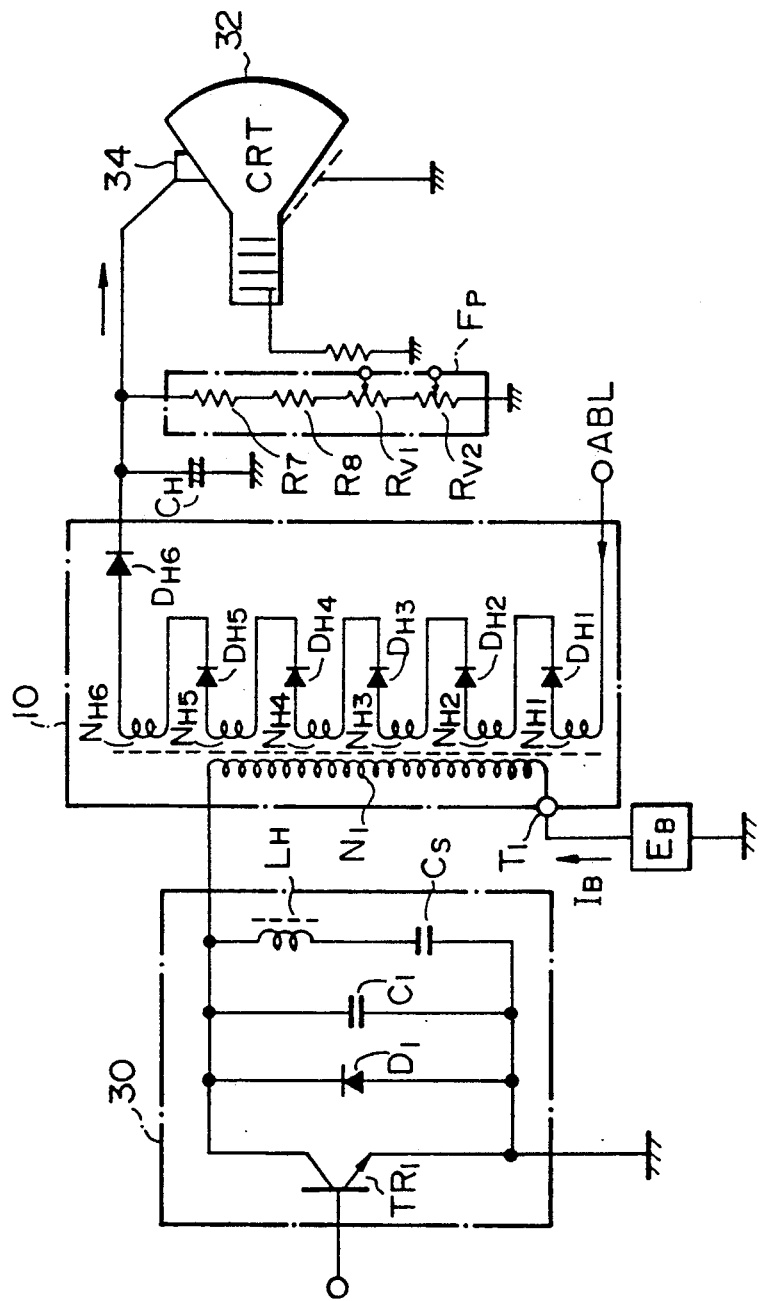
FIG. 3 is a schematic diagram showing, as an example, the use of the high-voltage transformer.
Figure 4:
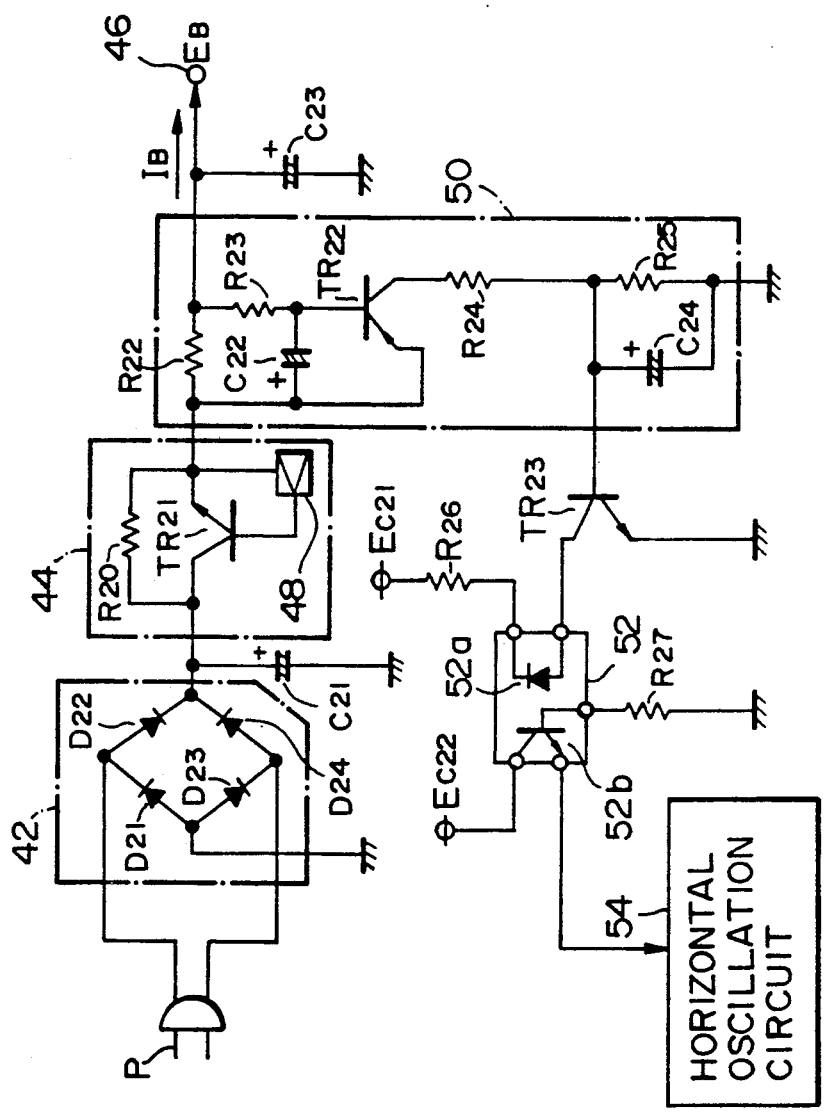
FIG. 4 is a schematic diagram used to explain the conventional high-voltage transformer protection circuit.

Next, FIG. 2 is a schematic diagram of the second embodiment. This embodiment is characterized in the connection at the node of the power source $E_B$ and resistor $R_1$ of a voltage division resistors $R_3$ and $R_4$, with their other end being grounded and with their intermediate point being connected to the gate of the thyristor SCR through a resistor $R_2$.

Accordingly, the gate-cathode voltage $V_{GK}$ of the thyristor SCR is expressed as follows.

$$V_{GK} = I_B R_1 - E_B \cdot R_3 / (R_3 + R_4) - (R_2 + R_3) I_{GT}$$

where E is the voltage of power source $E_B$, and $I_{GT}$ is the current flowing into the gate of the thyristor SCR when it turns on.

The voltage divided from the power voltage $E_B$ is applied in such a polarity relation as to prevent the thyristor SCR from turning on, which reduces the risk of erroneous activation of the thyristor SCR during the normal operation and allows the resistor $R_1$ for the primary current $I_B$ detection to have a high resistivity, and consequently the gate-cathode voltage $V_{GK}$ of the thyristor SCR can have a large variation range in response to the primary current $I_B$ and the thyristor SCR can have an enhanced operational sensitivity.

At the occurrence of a layer short or the like, an excessive current flows out of the power source $E_B$, causing the voltage of the power source $E_B$ to fall. Accordingly, the divided voltage also falls, making the thyristor SCR to turn on more easily, resulting in an enhanced sensitivity.

Owing to the resistors $R_2$ and $R_3$, the thyristor SCR can have a large time constant without imposing the capacitor $C_3$ to be much capacious, which reduces the risk of erroneous activation of the thyristor SCR when a sharp current flows due to an in-tube discharging of the SCR 30.

The diode $D_2$ and $C_2$ act on the anode of the thyristor SCR to reduce the pulsative voltage into a d.c. voltage, whereby the operational variability due to a scattered gate current $E_{GT}$ of the thyristor SCR can be minimized.

The turn-on voltage $V_{GT}$ and gate current $I_{GT}$ which are the characteristics of the thyristor SCR vary greatly depending on the temperature. Although this means that the circuit operation is affected by the temperature, the thyristor SCR is rendered the temperature compensation against the variation of characteristics by using a thermistor having a positive characteristics or a temperature sensitive resistor for the resistor $R_3$. Namely, by examining the thermal characteristics of the thyristor SCR in advance and selecting the thermal characteristics of the resistor R so that it offsets the thermal characteristics of the thyristor SCR, the temperature compensation is implemented and a stable operation can be accomplished against a varying temperature.

As described above, the inventive high-voltage transformer protection circuit performs effective current shut-off at the occurrence of abnormalities of high-voltage transformer by the addition of a simple circuit, whereby the high-voltage transformer can surely be prevented from heat generation, smoke eruption, and the like.

What is claimed is:

1. A high-voltage transformer protection circuit for protecting a high-voltage transformer which has a primary winding connected at one end thereof to a d.c. power source and at another end to a drive circuit, and generates a high-frequency current on the primary winding by being driven by said drive circuit, said protection circuit comprising:
- a fuse and current detecting resistor inserted in series between said d.c. power source and the one end of the primary winding of said high-voltage transformer with a first end of said fuse connected to said one end of said primary winding; and
- a semiconductor switching element connected between an intermediate tap of the primary winding and a second end of said fuse, and said semiconductor switching element becomes conductive when the voltage drop across said current detecting resistor exceeds a predetermined value, whereby when the switching element becomes conductive, an in flow of current through said semiconductor switching element breaks the fuse, thereby preventing a high-voltage winding from being supplied with an excessive current.

2. A high-voltage transformer protection circuit according to claim 1, wherein said semiconductor switching element comprises a p-gate 3-electrode turn-off thyristor having an anode connected to the intermediate top of the primary winding, a cathode connected to a node of said fuse and said current detecting resistor, and a gate connected to a node of said current detecting resistor and said d.c. power source.

3. A high-voltage transformer protection circuit according to claim 2, wherein a diode is inserted on the path extending from the intermediate top of the primary winding to the anode of said thyristor, and said thyristor has a parallel connection of a capacitor.

4. A high-voltage transformer protection circuit according to claim 3, wherein said current detecting resistor has a parallel connection of a capacitor.

5. A high-voltage transformer protection circuit according to claim 2, wherein said current detecting resistor has a parallel connection of a capacitor.

6. A high-voltage transformer protection circuit according to claim 1, wherein said semiconductor switching element is connected at the signal input terminal thereof to an intermediate node of a pair of voltage division resistors wherein the node between the pair of voltage division resistors is connected to the node of said d.c. power source and said current detecting resistor.

7. A high-voltage transformer protection circuit according to claim 6, wherein said pair of voltage division resistors comprise first and second resistors which are serially connected between said d.c. power source and ground, and the node between said first and second resistors is connected to the signal input terminal of said semiconductor switching element through a third resistor.

8. A high-voltage transformer protection circuit according to claim 6, wherein said semiconductor switching element comprises a p-gate 3-electrode turn-off thyristor having an anode connected to the intermediate point of the primary winding, a cathode connected to the node of said fuse and said current detecting resistor, and a gate connected to the node of said current detecting resistor and said d.c. power source.

9. A high-voltage transformer protection circuit according to claim 8, wherein a diode is inserted in the path extending from the intermediate top of the primary winding to the anode of said thyristor, and said thyristor has a parallel connection of a capacitor.

10. A high-voltage transformer protection circuit according to claim 9, wherein said current detecting resistor has a parallel connection of a capacitor.

* * * * *